United States Patent
Collier (10) Patent No.: US 6,811,299 B2
(45) Date of Patent: Nov. 2, 2004

(54) HOT COFFEE MIXING DEVICE FOR A COFFEE MAKER

(76) Inventor: Linda Ann Collier, 108 Greenpoint Cir., Chicopee, MA (US) 01020

( * ) Notice: Subject to any disclaimer, the term of this patent is extended or adjusted under 35 U.S.C. 154(b) by 110 days.

(21) Appl. No.: 10/143,913

(22) Filed: May 13, 2002

(65) Prior Publication Data

US 2003/0209152 A1 Nov. 13, 2003

(51) Int. Cl.[7] .......................... A47G 19/14; B01F 5/10; B01F 15/02
(52) U.S. Cl. .................. 366/130; 366/165.2; 99/287
(58) Field of Search .................. 366/130, 165.2, 366/166.1, 167.1, 165.5, 165.1; 99/287, 304

(56) References Cited

U.S. PATENT DOCUMENTS

| | | | | |
|---|---|---|---|---|
| 67,185 A | * | 7/1867 | Fobes | 99/304 |
| 537,961 A | * | 4/1895 | Bechaux | 99/287 |
| 629,776 A | * | 8/1899 | Crawford | 99/304 |
| 636,195 A | * | 10/1899 | Burckard | 99/304 |
| 673,371 A | * | 4/1901 | Thorp | 99/304 |
| 1,029,487 A | * | 6/1912 | Burdick | 366/166.1 |
| 1,070,711 A | * | 8/1913 | McGregor | 366/165.1 |
| 1,115,872 A | * | 11/1914 | Siebert | 99/304 |
| 1,201,284 A | * | 10/1916 | Gilchrist | 366/130 |
| 1,275,556 A | * | 8/1918 | Hall | 366/166.1 |
| 1,878,924 A | * | 9/1932 | Will | 366/130 |
| 2,021,495 A | * | 11/1935 | Anderson | 366/130 |
| 2,522,102 A | * | 9/1950 | Dold | 366/165.1 |
| 3,324,787 A | * | 6/1967 | McCleary | 99/319 |
| 3,920,226 A | * | 11/1975 | Walt | 366/130 |
| 4,332,482 A | * | 6/1982 | Engler | 366/130 |
| 4,443,481 A | * | 4/1984 | Donarumma et al. | 99/304 |
| 5,941,635 A | * | 8/1999 | Stewart | 366/165.5 |

* cited by examiner

Primary Examiner—Tony G. Soohoo (57) ABSTRACT

The hot coffee mixing device comprises one embodiment having a hollow cylindrical tube with a bottom end with liquid outlet(s) thereon which rests upon the bottom surface of the carafe when in use. The top end of the device has a liquid inlet which is located in close proximity to the center of the carafe and the lid of the carafe. The liquid inlet and outlet(s) are connected by a channel. Another embodiment of the hot coffee mixing device is suspended from the lid of the coffee carafe and comprises a hollow cylindrical tube having a bottom end with liquid outlet(s) thereon, not resting upon the bottom of the carafe, and the top end of the device has a liquid inlet and means for supporting the device on the lid of the carafe. In yet another embodiment, the hot coffee mixing device may be either free standing on the bottom of the coffee carafe or suspended from the lid of the coffee carafe or the coffee carafe itself when in use. In any embodiment, a swirling device may be added to the bottom end of the tube to further aid in mixing of the brewing hot coffee liquid and may be an integral part of the liquid outlet(s).

11 Claims, 11 Drawing Sheets

HOT COFFEE MIXING DEVICE FOR A COFFEE MAKER

CROSS-REFERENCES TO RELATED PATENT APPLICATIONS

Not Applicable.

STATEMENT REGARDING FEDERALLY SPONSORED RESEARCH AND DEVELOPMENT

Not Applicable.

BACKGROUND OF THE INVENTION

The present invention relates to devices for mixing a forming hot liquid having different concentrations during a brewing process, and, in particular, relates to coffee makers, and, further relates to devices for insuring that brewed coffee in a carafe is uniformly mixed both during and immediately after the brewing process.

A conventional coffee maker comprises, basically, a housing having a water chamber, a water heating device, a coffee grounds container with a filter therein, a coffee carafe, a coffee carafe heating device, and associated electronics. Other features may be included such as means for controlling the flow of hot water into the coffee grounds container, means for allowing the pouring of a cup of coffee during the brewing process, etc.

In use, a desired amount of coffee grounds are placed in the filter of the coffee grounds container. A desired amount of water, a predetermined volume, is placed in the water chamber from the carafe. The water heating device is turned on and this takes the water from the water chamber and heats it to a sufficient degree and forces the hot water into the area of the coffee grounds. The hot water falls onto the top of the coffee grounds and flows through the coffee grounds removing a certain amount of the coffee chemicals from the coffee grounds to make the coffee flavored liquid. The hot coffee liquid formed thereby flows from the coffee grounds container into a coffee carafe which may be separately heated from the water. The initial amount of hot coffee liquid is highly concentrated in flavor and the hot coffee liquid progressively becomes weaker as the last amount of hot water flows through the coffee grounds. Thus, the coffee carafe contains a highly concentrated coffee liquid in the bottom of the carafe and a much lighter concentration of coffee liquid in the top of the carafe.

As the hot coffee liquid either drips or runs as an input stream from the bottom of the coffee grounds container, the most concentrated coffee liquid is at the bottom of the carafe. As the carafe becomes full, the hot coffee liquid strikes an upper surface of the coffee liquid in the carafe. Because the most recent hot coffee liquid is hotter than the initial coffee liquid, it will have a tendency to remain near the top of the carafe, and further the falling drips and/or input stream will not penetrate the existing liquid to reach the bottom area. Because of both of these effects, the top volume of coffee liquid is significantly lower in concentration than the bottom volume of coffee liquid. This is obvious to one who immediately pours a cup of coffee as the carafe fills. It is also an irritant to one who later pours a cup of coffee and finds it of a much lower concentration than desired.

One may attempt to remedy this problem by various techniques. One may remove the carafe full of coffee liquid and vigorously shake it, but this may cause the hot coffee to splash out and burn the person doing this or others nearby. Another techniques is to agitate the coffee grounds container as shown in U.S. Pat. No. 5,957,035 which is incorporated by reference. This requires the addition of a controllable electric motor interfaced by gears, levers, sensors, etc. to the coffee grounds container to impart a desired motion thereto. This substantially increases the cost of the coffee maker, but the initial flow of coffee liquid will still be more concentrated than the last amount just because there is less coffee chemicals in the grounds and the amount of time it takes the water to flow through the container is the same. This technique insures that all of the grounds become active from almost the initial flow of hot water.

Thus, there exists a need for a hot coffee mixing device to insure that the concentration of coffee chemicals in the hot coffee liquid is uniform within the carafe.

BRIEF SUMMARY OF THE INVENTION

The present invention provides a hot coffee mixing device that is placed within the carafe and channels the flow of hot coffee liquid to the bottom of the carafe to insure a maximum mixing of the hot coffee liquid in the carafe and a process of using the device.

One hot coffee mixing device comprises a hollow cylindrical tube having a bottom end with liquid outlet(s) thereon which rests upon the bottom of the carafe when in use. The top end of the device has a liquid inlet which is located in close proximity to the center of the carafe and the lid of the carafe. The hot coffee mixing device is thus free-standing within the coffee carafe and may be placed under the lid of the carafe. The lid has a centralized aperture therein through which the hot coffee liquid flows from the bottom of the coffee grounds container and into the hot coffee mixing device.

A second embodiment of a hot coffee mixing device comprises a hollow cylindrical tube having a bottom end with liquid outlet(s) thereon, not resting upon the bottom of the carafe. The top end of the device has a liquid inlet and means for supporting the device on or under the lid of the carafe. The device may be removably attached to the lid of the carafe so that when the carafe is moved, the device does not fall over inside the carafe and this feature further allows for the withdrawal of the hot coffee mixing device and its removable from the lid if desired.

A third embodiment of the present invention allows the hot coffee mixing device to be suspended from the coffee carafe in some manner, not necessarily from the lid.

One feature of the first embodiment provides a flexible cord handle that is attached to the top of the device and positioned outside of the carafe when in use. After the hot coffee liquid fills the carafe, the lid is removed and the cord handle is grasped and the device is lifted from the carafe.

Another feature of the first or third embodiment provides a bottom end of the device having an enlarged shape to provide additional stability to the device.

A further feature of the first or third embodiment provides a liquid inlet having a frustum shape to insure that the flowing hot coffee liquid enters the device even though it is not exactly centered on the aperture in the lid of the carafe or in the opening in the carafe.

A still further feature of the present invention provides liquid outlet(s) of various configurations to further aid in the mixing of the hot coffee liquid.

Yet another feature of the present invention provides a means located in the bottom end for swirling the hot coffee liquid exiting from the liquid outlets in the bottom end to further aid in the mixing of the hot coffee liquid.

And still another feature of the present invention provides a device having a cylindrical tube with an expanding cork screw shape to further aid in the mixing of the hot coffee liquid.

These and many other objects, features and advantages of the present invention will be ready apparent to one skilled in the pertinent art from the following detailed description of a preferred embodiment of the invention and the related drawings.

DETAILED DESCRIPTION OF THE INVENTION

The hot coffee mixing device of the present invention is intended to be used in the conventional coffee maker, but may be adapted to other applications where the mixing of a hot liquid because of changes in concentration occurs by passive means such as disclosed herein.

Figure 1:
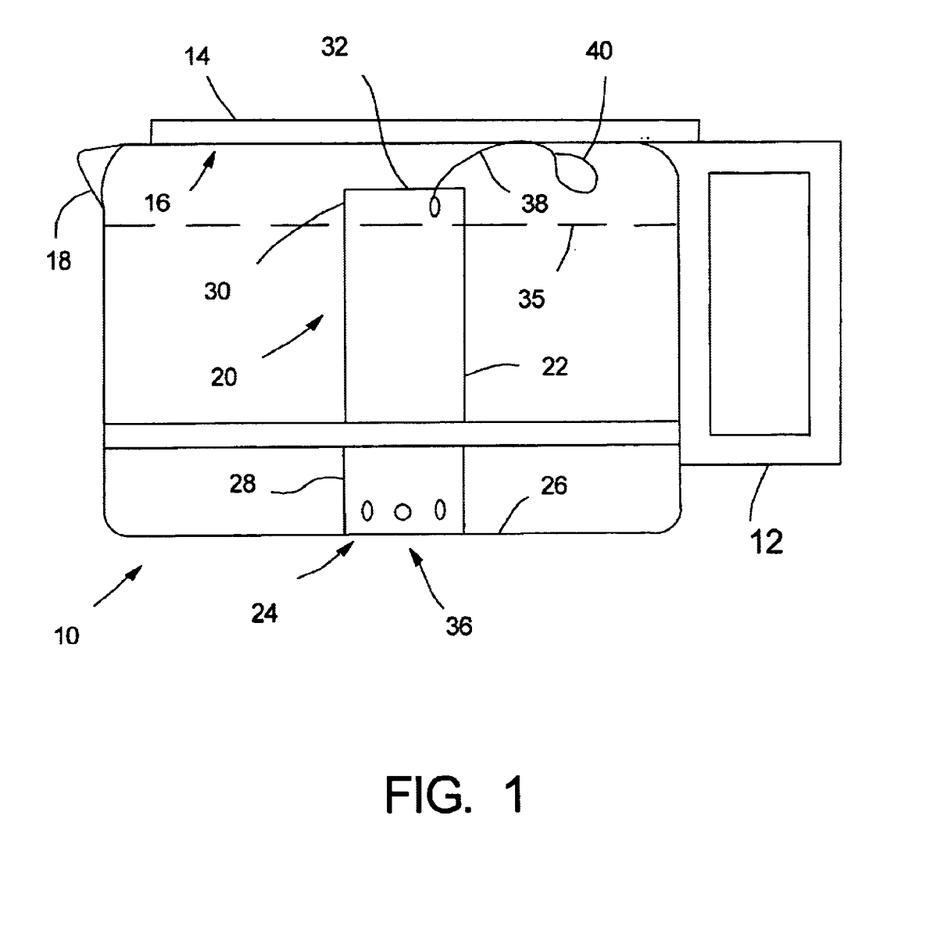
FIG. 1 illustrates by a side view a coffee carafe with the first embodiment of the free standing hot coffee mixing device therein of the present invention.

Referring to FIG. 1, a conventional coffee carafe 10 is shown having a capacity of 12 cups, for example. Carafe 10 is normally made of Pyrex glass with a plastic handle 12 attached thereto. A lid 14 is removably attached in a top opening 16 of the carafe 10 and is further detailed herein. The carafe 10 has a pouring spout 18 integrally formed in the carafe 10 and is normally formed opposite to the handle 12. The other parts of the coffee maker are considered conventional and not further disclosed.

Shown inside of carafe 10 is a first embodiment of a free standing hot coffee mixing device 20. The device 20 comprises a tube-like device being a hollow cylindrical tube 22 having a bottom end 28 with at least one liquid outlet 24. The tube 22 is of a sufficient diameter to freely stand upright on a bottom 26 of the carafe 10. A top end 30 of device 20 has at least one liquid inlet 32 and is of a sufficient diameter to insure that the hot coffee liquid passing through an aperture 34 (FIG. 6A, for example) in the lid 14 enters into the liquid inlet 32. The top diameter may be ½ to 1 inch. The top end 30 does not contact the lid 14 but is sufficiently near thereto. The overall length from the bottom end 28 to the top end 30 may be adjustable as described herein. In the bottom end 28 a plurality of holes 36, circular or otherwise, are formed about the circumference of the bottom end 28 to insure that the hot coffee liquid flows out near the bottom 26. Attached to the top end 30 is a flexible cord handle 38 that is used to remove the device 20 from the carafe 10 or upright the device if it falls over. The flexible cord handle 38 may be made of metal or plastic and is appropriately attached to the top end 30 by conventional means. If, for example, the flexible cord is plastic, an end may be placed through a hole in the top end 30 and the end of the cord melted to form an enlarged section to prevent removal. The handle 40 is placed outside of the carafe 10. Although, the cord handle 38 is not required, it is a positive feature if, for example, the device 20 falls over inside the carafe 10 it can then be easily removed or placed upright again. The device 20 or others disclosed herein may be made of appropriate metal or plastic and must be machine washable. The device 20 may be made of appropriately colored material to match the decor of the surrounding area.

Figure 2:
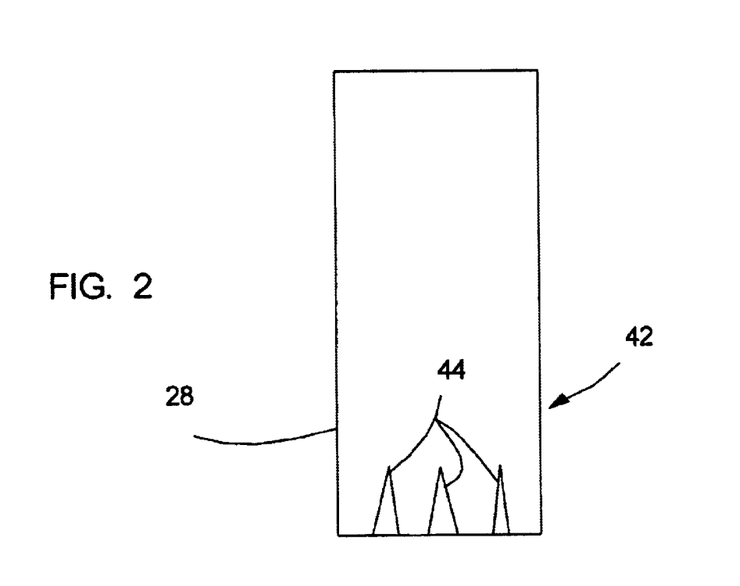
FIG. 2 illustrates by a side view another embodiment of the free standing hot coffee mixing device of the present invention.

FIG. 2 shows a side view of another hot coffee mixing device 42 wherein the bottom end 28 has a plurality of notches 44 spaced about the circumference of the bottom end 28. The notches 44 may be triangular, square, half circles, etc.

Figure 3A:
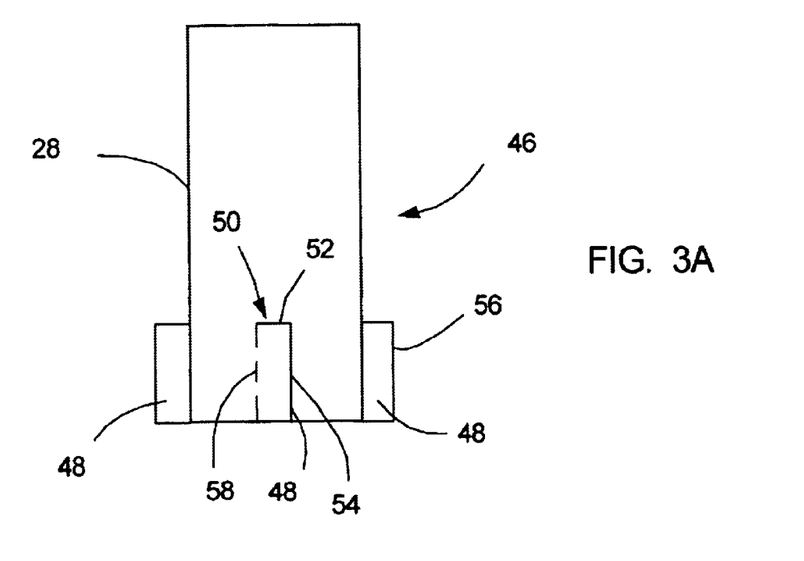
FIG. 3A illustrates by a side view a third embodiment of the free standing hot coffee mixing device of the present invention.
Figure 3B:
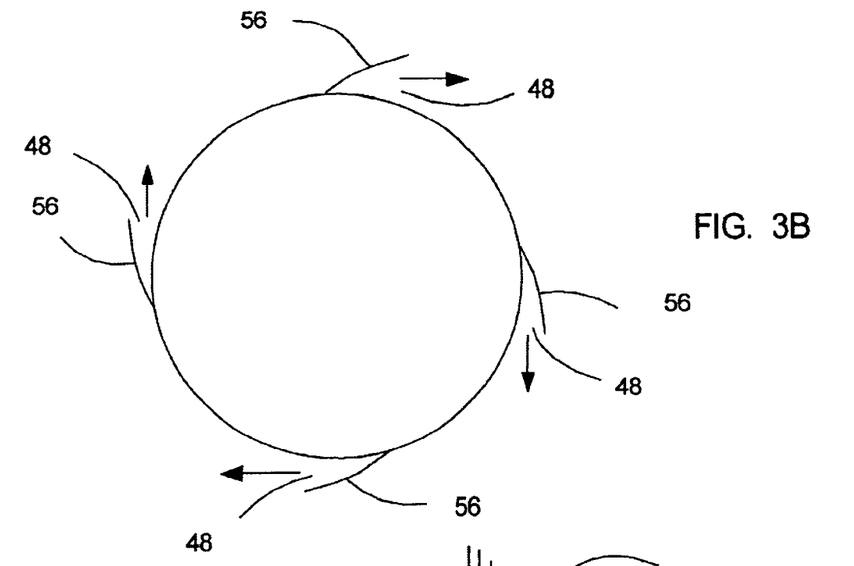
FIG. 3B illustrates a bottom view of the third embodiment showing a swirling means thereon.

FIG. 3A illustrates by a side view another hot coffee mixing device 46 having a plurality of liquid outlets 48, three as shown, incorporating means for swirling. A swirling vane 50 is formed in the bottom end 28. A short horizontal cut 52 and a vertical cut 54 meet to form an "L." A vane member 56 is formed and is bent outwards about a dotted vertical line 58. As the liquid flows from the liquid outlets 48, it is forced to move in a clockwise direction as viewed from the bottom end 28. This motion will further be imparted to the hot coffee in the carafe 10 as the hot coffee liquid rises in the colder coffee liquid to maximize the mixing. FIG. 3B illustrates schematically by a bottom view of the device 46 having four vane members 56 with appropriate arrows indicating the direction of the liquid leaving the liquid outlets 48. Since carafes 10 are of cylindrical shape in the vertical direction, a swirling motion will be impressed on the hot coffee liquid in the carafe 10.

Figure 4:
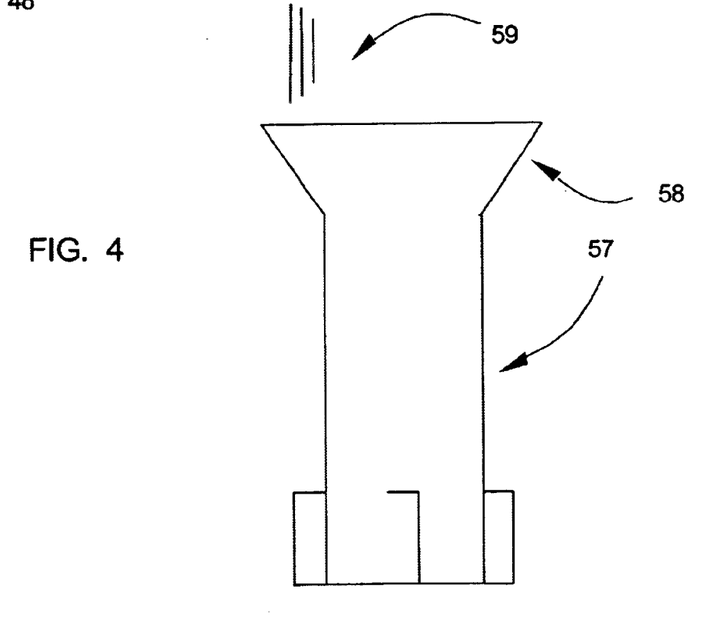
FIG. 4 illustrates by a partial side view a funnel being a part of the top end of the free standing hot coffee mixing device of FIG. 3B.

FIG. 4 illustrates the device 46 having a frustum or funnel shaped top end 58 to better insure that the hot coffee liquid stream 59 enters into the device 46. This will aid the user in rapidly placing the devices of the present invention into the carafe 10 proximately centered therein.

Figure 5A:
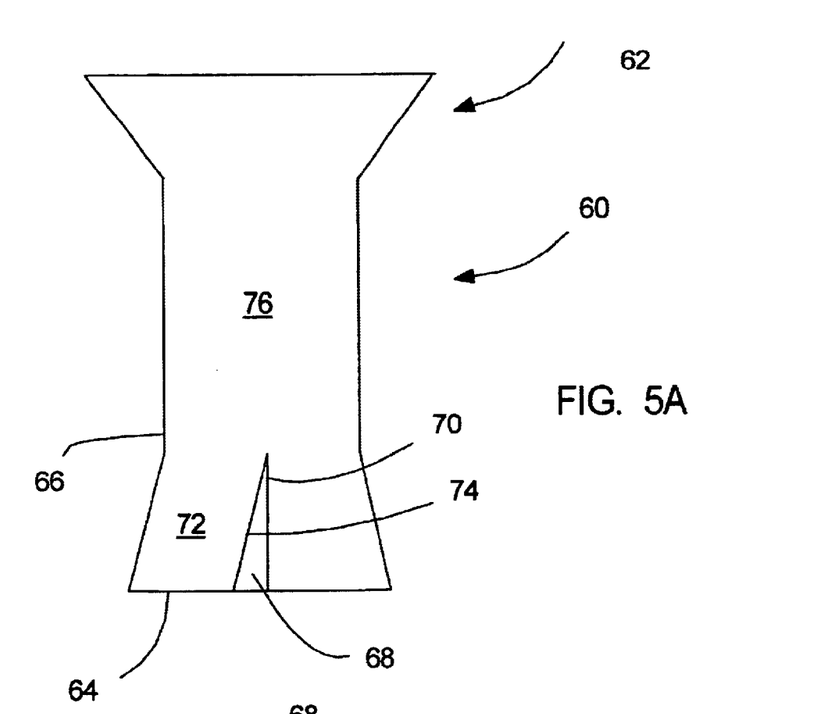
FIG. 5A illustrates by a partial side view a free standing hot coffee mixing device having an enlarged bottom section with swirling means thereon.
Figure 5B:
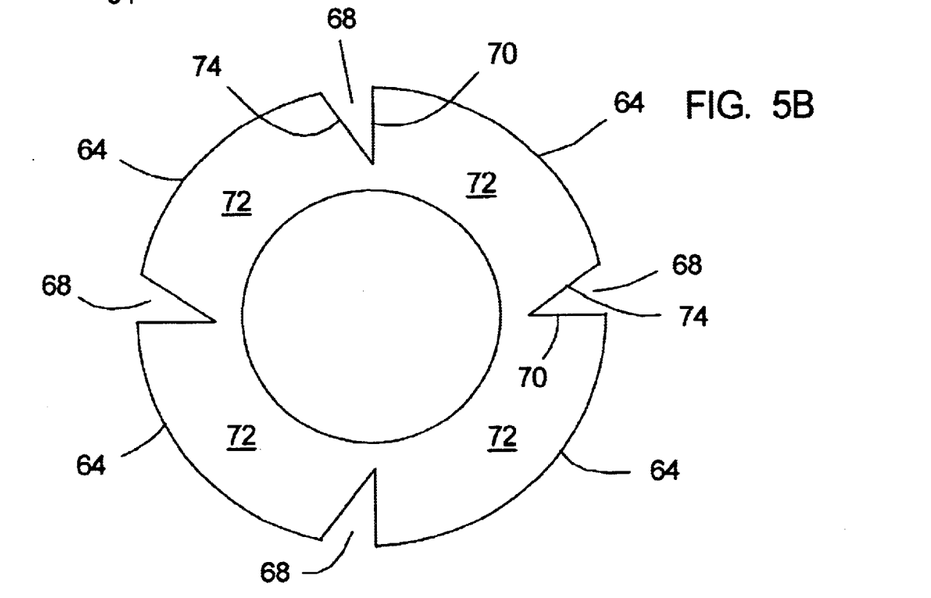
FIG. 5B illustrates by a bottom view the swirling means of FIG. 5A.

FIG. 5A illustrates by side view a hot coffee mixing device 60 and FIG. 5B illustrates this from the bottom end view. The device 60 has a frustum shaped top end 62 and has a plurality of swirling vanes 64 on the bottom end 66 to form the liquid outlets 68. Vertical cuts 70 form a vertical wall section 72 which is twisted at the bottom so that one edge 74 extends farther from a tube wall 76.

Figure 6A:
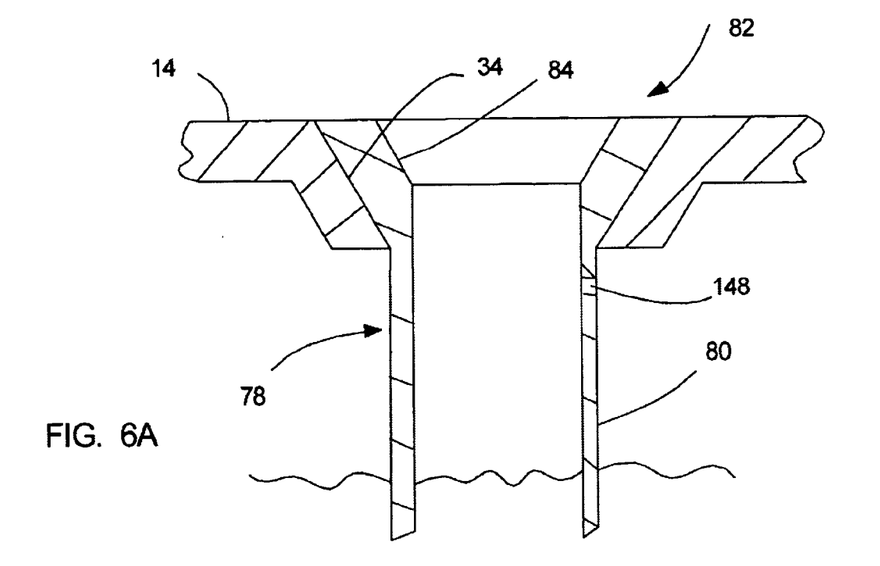
FIG. 6A illustrates by a partial cross section a suspended hot coffee mixing device of the present invention and its positioning in the lid of the carafe.
Figure 7A:
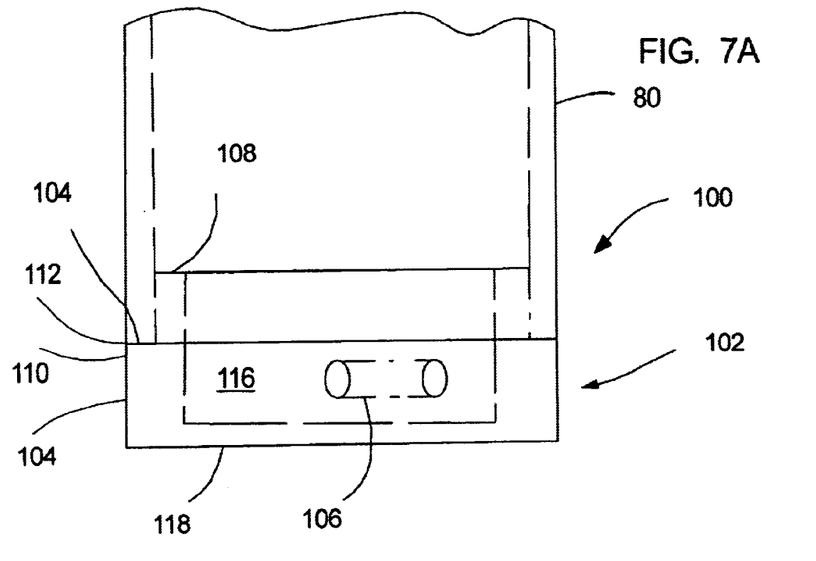
FIG. 7A illustrates by a side view a bottom end of the suspended hot coffee mixing device having a swirling means attached thereon.

The second embodiment of the present invention is a hot coffee mixing device 78 suspended from the lid 14 as shown in FIG. 6A when in use. The device 78 comprises a tube-like device being a hollow cylindrical tube 80 having a bottom end with liquid outlet(s) thereon such as shown in FIG. 7A, not resting upon the bottom of the carafe 10. The top end 82 of the suspended hot coffee mixing device 78 has a liquid inlet 84 designed and configured to fit on or in the aperture 34 of the lid 14 or by other means for supporting the device on the lid of the carafe. As seen in FIG. 6A, the liquid inlet 84 is frustum shaped and is an integral part of the tube 80 and rests in the frustum shaped aperture 34. Additionally, an air vent hole 148 is provided in the tube 80 near the top end 82 to prevent a water seal over the tube 80. This can occur if the venting air exiting the top end 82 is blocked by water trying to flow into the tube 80 but the air vent hole 148 in the side of the tube 80 provides an alternate vent if a large amount of hot coffee liquid is trying to enter the tube 80. This device 78 does not fall over inside the carafe and this feature further allows for the withdrawal of the hot coffee mixing device 78 from the lid if desired.

Figure 6B:
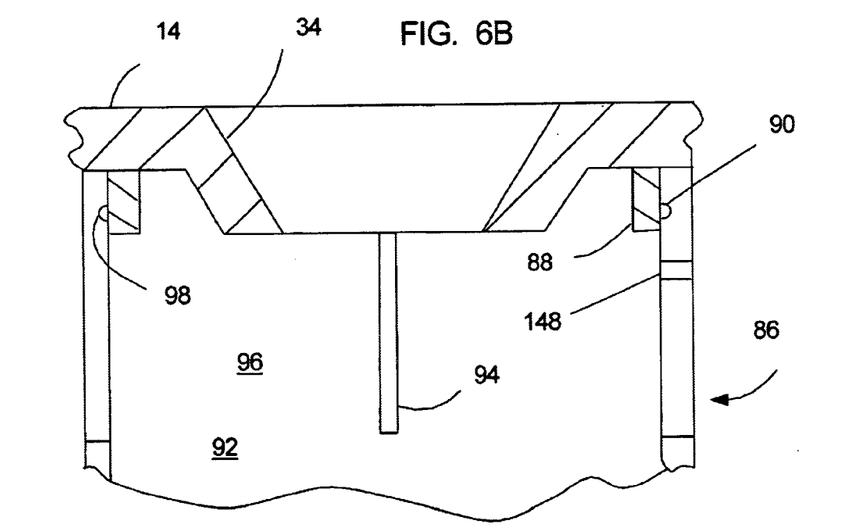
FIG. 6B illustrates by partial cross section another suspended hot coffee mixing device of the present invention removably attached to the lid.

FIG. 6B illustrates by partial cross section the lid 14 having a frustum shaped aperture 34 with a hot coffee mixing device 86 removably attached to a flange 88 by friction fit thereover or by a detent ridge 90 formed on the flange 88. The top end 92 has a plurality of vertical slots 94 cut therein so that end sections 96 may flex away from the center axis as the device 86 is pushed onto the flange 88. A detent groove 98 is formed about the inside of the end sections 96 to fit over the detent ridge 90. If the vertical slots 94 do not provide a sufficient air vent an additional air vent 148 may be formed in the side of the tube 80.

Figure 7B:
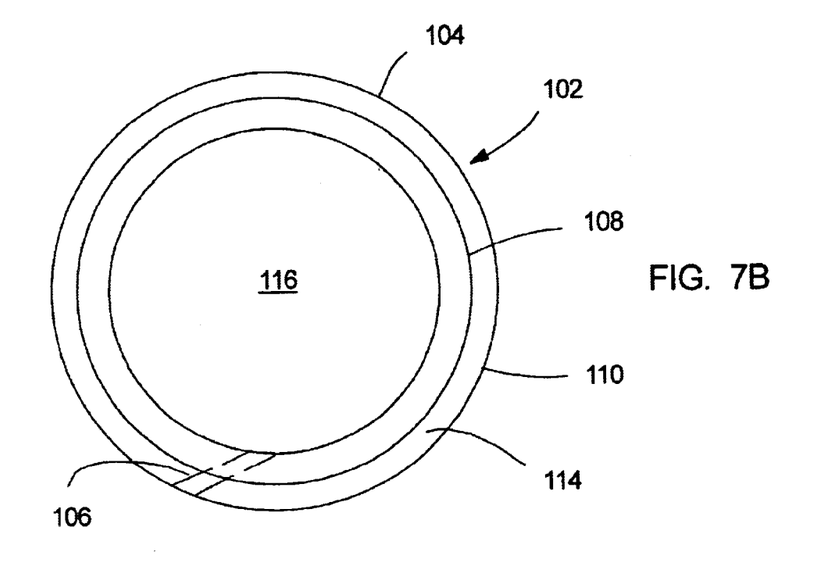
FIG. 7B illustrates by a top view the swirling means of FIG. 7A.

In FIG. 7A, a bottom end 100 of the cylindrical tube 80 of the suspended hot coffee mixing devices is shown having means for swirling being a swirling device 102 attached therein rather than just a plain end opening as would be provided by the cylindrical tube 80 itself. The device may have many different configurations to impress a swirling action upon the hot coffee liquid flowing therefrom, and the embodiment shown is only one possible configuration. The swirling device 102 is a cap 104 inserted into the end of the tube 80 and has a plurality of angled channels 106, only one shown. FIG. 7B is a top view of the cap 102 removed from the tube 80. A flange 108 closely fits within the end of the tube 80 and is attached to a cap wall 110. The end 112 of the tube 80 rests upon a shelf 114 which is the upper part of the cap wall 110. An interior volume 116 in cap 104 is formed between the cap wall 110, flange 108, and a bottom 118. The angled channels 106 are drilled, for example, through the cap wall 110 into the volume 116.

Figure 8:
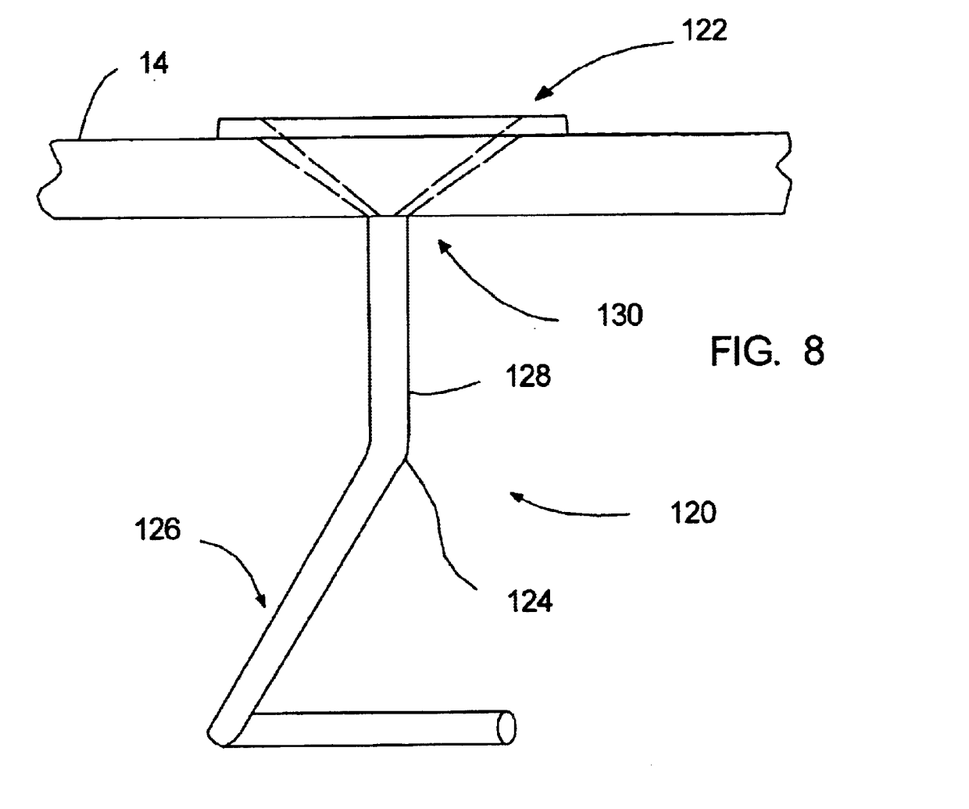
FIG. 8 illustrates by a side view another embodiment of the suspended hot coffee mixing device with integral swirling means thereon.

Another embodiment of the suspended hot coffee mixing device 120 is shown in FIG. 8. A frustum shaped liquid inlet 122 fits onto the top of the lid 14. A cylindrical tube 124 is attached to the liquid inlet 122. The tube 124 is formed to have a cork screw shaped liquid outlet 126 attached to a straight section 128 of the tube 124. Although, the entire tube 124 may be cork screw shaped. The device 120 may be easily inserted into and removed from the aperture 130 of the lid 14. It is further seen that device 120 may also act as a free standing device and thus another embodiment is thus possible: a device that can be either free standing on the bottom of the coffee carafe when in use or suspended from the lid of the coffee lid when in use or otherwise.

Figure 9:
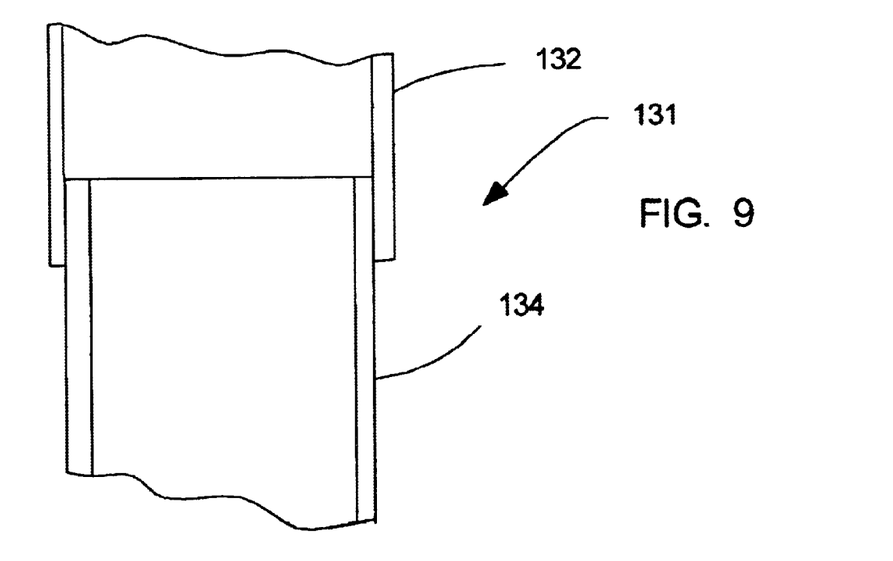
FIG. 9 illustrates a slip joint in a cylindrical tube of the present invention for changing the height of the hot coffee mixing device.

In order to provide a universal fit of the devices of the present invention into coffee carafes 10 of different heights, a translatable joint 130 is shown in FIG. 9. The translatable joint 130 comprises an upper tube section 132 formed to closely fit over a lower tube section 134. By use of moderate force, the tubes 132 and 134 may be moved to adjust the overall height of the devices of the present invention and may even further aid in the cleaning of the device since it may be partially taken apart.

Figure 10:
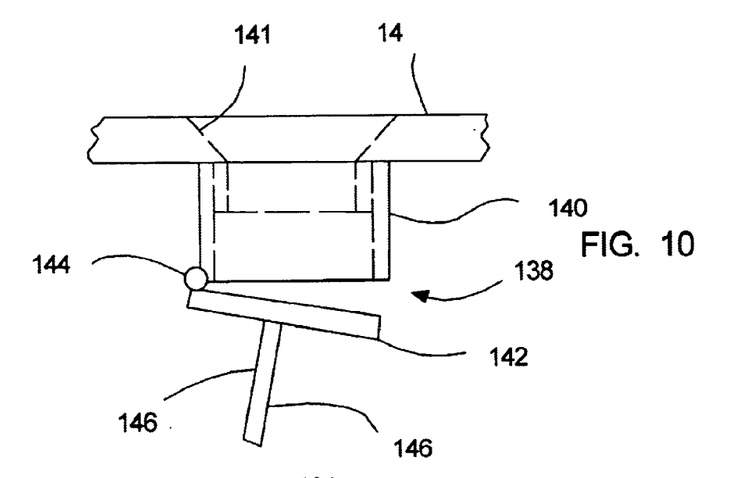
FIG. 10 illustrates a spring loaded, suspended hot coffee mixing device of the present invention.

In order to provide a means for storing the suspended hot coffee mixing device of the present invention, FIG. 10 illustrates a spring loaded, hot coffee mixing device 138. A housing 140 fits around the aperture 134. A cover 142 has a spring loaded hinge 144 of conventional design that biases the cover 142 into contact with the housing 140. A cylindrical tube 146 is attached to the cover 142.

Figure 11:
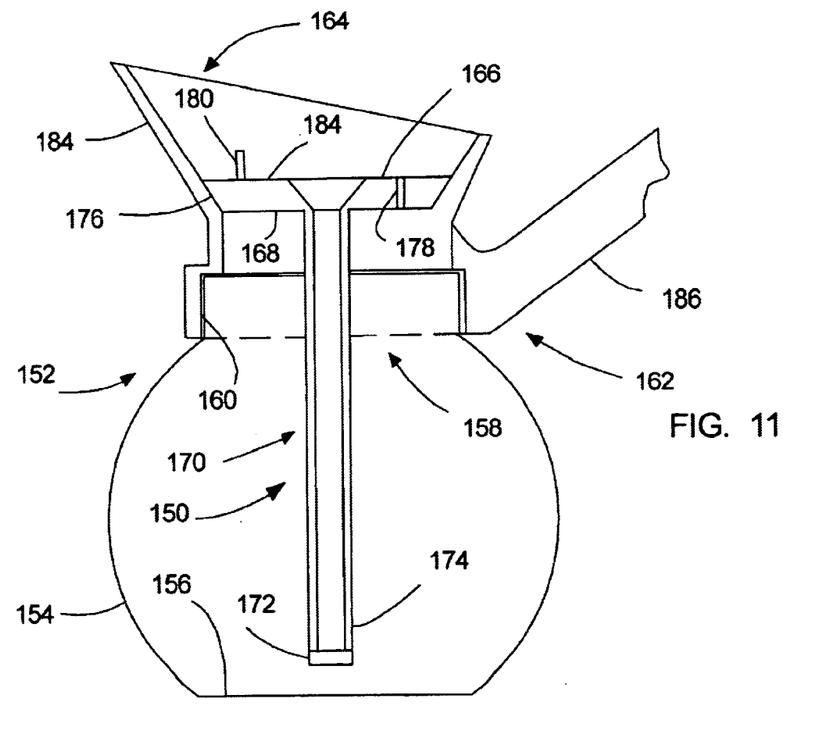
FIG. 11 illustrates by partial cross section a hot coffee mixing device usable in a coffee carafe without a lid and suspended in a neck thereof.

A still further embodiment of the present invention, FIG. 11, provides a hot coffee mixing device 150 that is usable in a coffee carafe 152 that brews coffee without the use of a lid and is of the type used in restaurants, convenience stores, etc. in automatic coffee machines. The coffee carafe 152 has a liquid container 154 of oval shape with a flat bottom 156. Attached in an open end 158 of a top end 160 is a collar 162 that has formed therein a frustum shaped funnel 164. A handle 186 is integrally attached to the collar 162. The hot coffee mixing device 150 has a frustum shaped top end 166 for collecting the stream of coffee from the coffee grounds container, not shown, and further fits within the frustum shaped funnel 164. Attached to a bottom 168 of the frustum shaped top end 166 is a tube-like device 170. The tube-like device 170 may be an integral part of the frustum shaped top end 166 or be removably attached thereto as is also shown herein above in other embodiments. An air vent 178, one or more, may be formed in the top end 166 if no other provision is made for allowing the escape of air within the carafe 152 as the coffee fills it. In addition, a swirling device 172 may be added to a bottom end 174 of the tube-like device 170. An outer edge 176 of the frustum shaped top end 166 is formed to fit closely with the funnel 164 with a complementary wall. As shown, the device 150 is self-centering within the collar 162 and may be easily removed after the brewing process is completed by grasping an upper lip 180 extending from a funnel surface 182 so the attendant may rapidly pour coffee therefrom.

Figure 12:
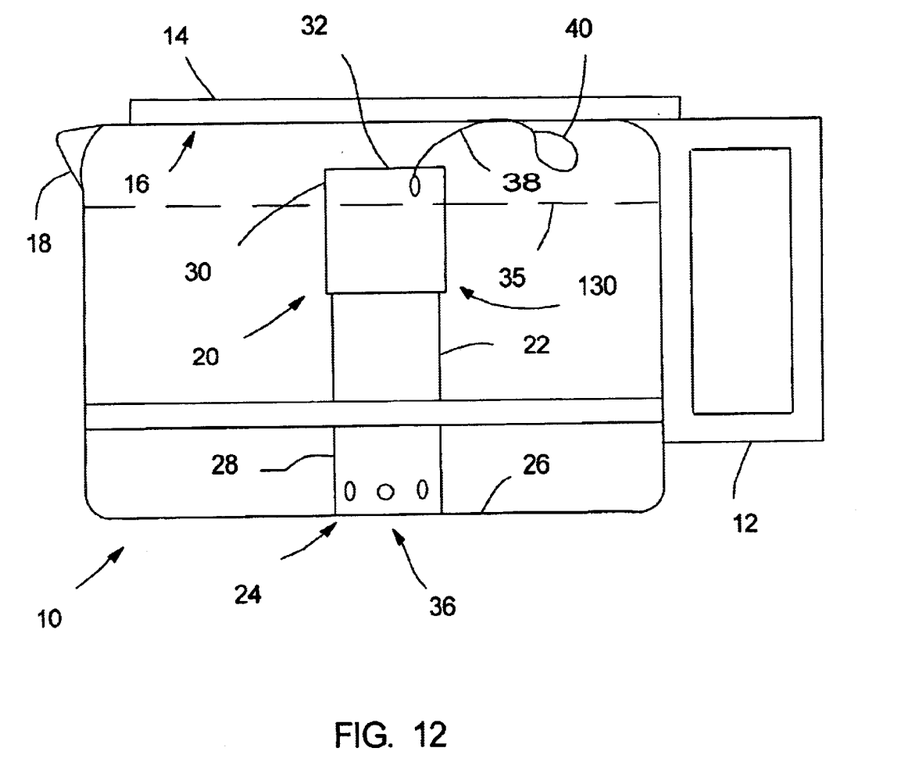
FIG. 12 illustrates by a side view the coffee carafe of FIG. 1 having a translatable joint in the free standing hot coffee mixing device of a first embodiment.

FIG. 12 shows the conventional glass-like coffee carafe 10 having the free standing hot coffee mixing device 20 therein such as shown in FIG. 1 also. The mixing device 20 in FIG. 12 includes the translatable joint 130 as shown in FIG. 9 and in claim 18. In that the mixing device 20 is used in the conventional glass-like coffee carafe 10, the manufactured height of device 20 may be made sufficiently close to the lid 14 so that there is no need for a translatable joint 130 and at no time does the maximum coffee level 35 exceed the height of the device 20. As noted above, the diameter of the device may be ½ to 1 inch and it may be made of metal or plastic to form any of the shapes shown in the figures as noted below. FIG. 1 or FIG. 12 illustrates a conventional glass-like coffee carafe. The drawing is approximately one half scale and the sizes of the devices shown therein are considered to be relative to the coffee carafe size shown such as in FIG. 1.

Figure 13:
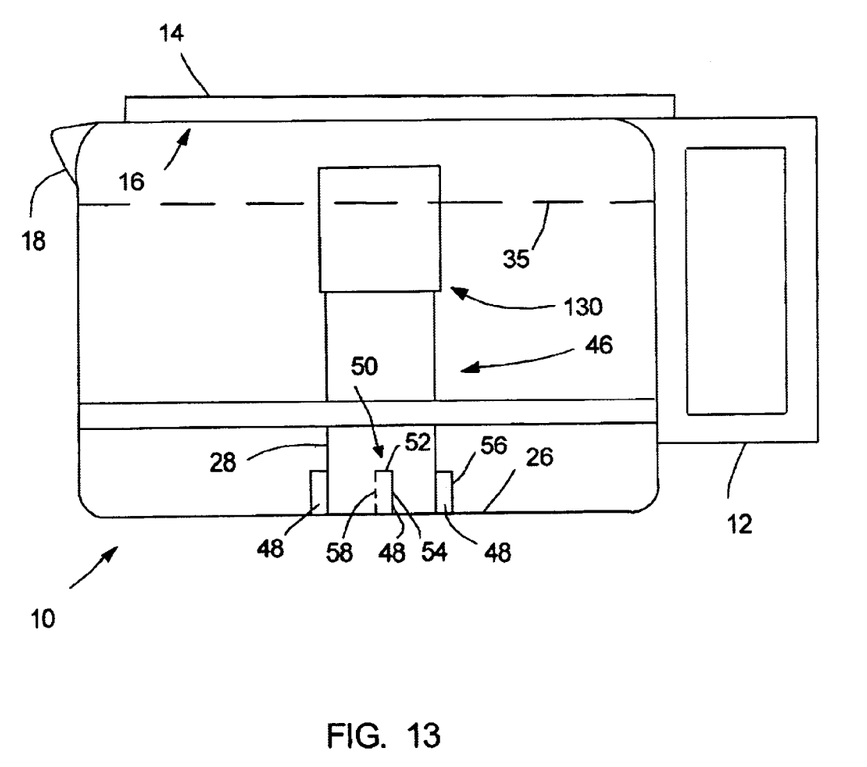
FIG. 13 illustrates by a side view the coffee carafe having therein a free standing hot coffee mixing device being the third embodiment as shown in FIG. 3A with a translatable joint therein.

Referring to FIG. 13, again the conventional glass-like coffee carafe 10 is shown having the hot coffee mixing device 46 therein as a free standing device. As seen therein, the device 46 includes the translatable joint 130 which is noted hereinafter may be used in the devices of the present invention. The construction, features and use of the device 46 is similar to device 20 except that device 46 includes swirling means therein as noted in claim 14. A plurality of twisted wall sections also noted as swirling vanes 50 or 64 in the discussion above as to FIG. 3A or FIG. 5A, respectively. As to FIG. 3A, the twisted wall sections are formed in the bottom end 28 of the device 46. A short horizontal cut 52 and a vertical cut 54 meet to form an "L" shaped cut. The vane member 56 is formed and is bent outwards about a dotted vertical line 58. As seen in FIG. 3B, the device 46 may have 4 vanes 56. FIG. 4 includes a funnel shaped top end 58 on the device 46. FIGS. 5A and 5B disclose another device 60 having means for swirling being a plurality of swirling vanes 64. Vertical cuts 70 are made in the tube which form a vertical wall section 72 which is bent away from the tube in an outward direction as seen in FIG. 5B. After, the edge 74 of one side of the cut 70 is further twisted away to form a twisted wall section so that the exiting fluid receives a swirling motion relative to the bottom of the device 60 which is seated on the bottom of the carafe 10.

Figure 14:
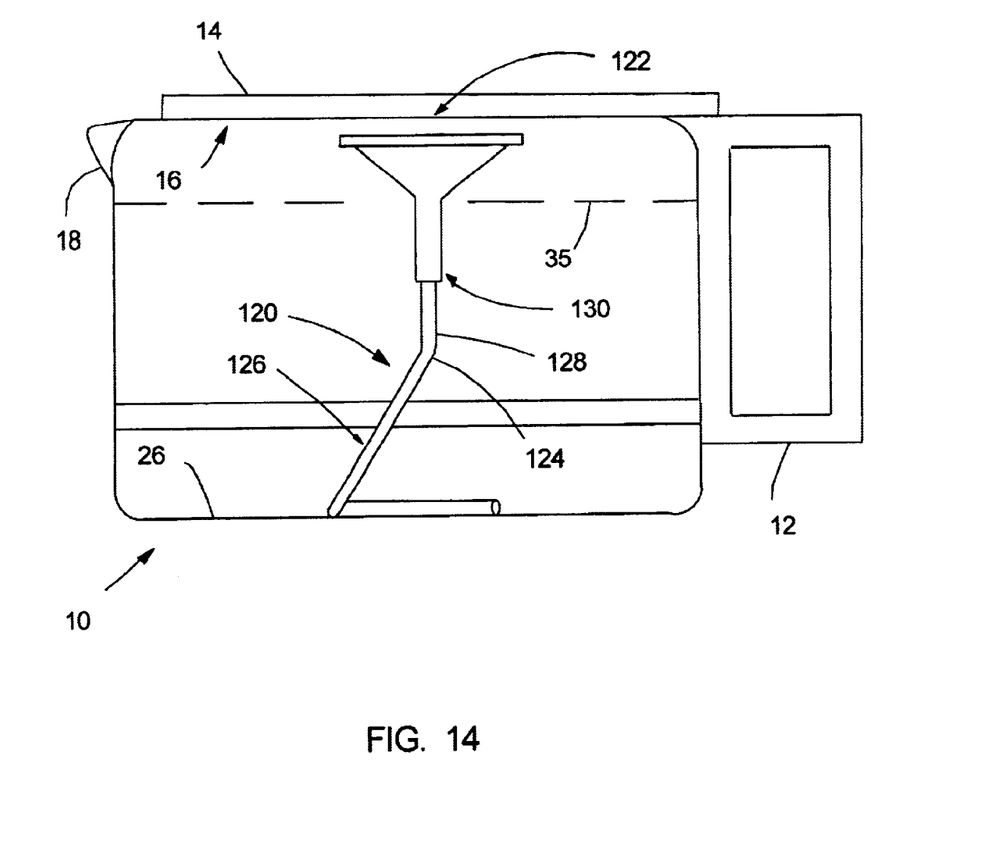
FIG. 14 illustrates by a side view the coffee carafe of FIG. 1 having therein a free standing hot coffee mixing device being the device of FIG. 8 removed from the lid as seen in FIG. 8, also with a translatable joint therein.

FIG. 14 illustrates the device 120 of FIG. 8 removed from the lid 14 and placed in the coffee carafe 10 to be a free standing hot coffee mixing device 120 as shown in FIG. 14. Claim 15 notes that a means for swirling comprises a cork screw tube. In the explanation of FIG. 8 above, it notes that the tube 124 is formed to have a cork screw shaped liquid outlet 126 attached to the straight section 128 of the tube 124. As seen in this figure or FIG. 8, the cork screw tube or the cork screw shaped liquid outlet spirals downward and at a certain point becomes substantially perpendicular to the straight tube 128 as seen in the figures. It further spirals around to form a base upon which the device 120 sits upon when in the free standing mode as noted hereinabove as to FIG. 8. Since device 120 may be fitted into the lid 14 as seen in FIG. 8, when the device 120 is removed from the lid 14 and used as a free standing device as seen in FIG. 14, the height of the device will be less than the height from the lid to the bottom 26 of the coffee carafe 10. This height may be adjusted when the translatable joint 130 is included in the straight section 128. A cross section of the translatable joint 130 is shown in FIG. 9 wherein one tube is made to fit closely within another tube to allow translation and thus an adjustment in the overall vertical height of the device 120 as shown in FIG. 14. The device 120 may be formed of plastic and shaped by injection molding techniques as noted below.

The use of the hot coffee mixing devices of the present invention is understood from the above detailed description. In summary, the device may be free-standing or attached either to the lid or to the collar of a coffee carafe. The tube-like device channels the input stream of hot coffee to the bottom of the carafe. The hot coffee liquid existing from the liquid outlets in the bottom end of the device will mix with the liquid already in the carafe by natural currents or by swirling action caused by the device. Since the latest hot coffee liquid is hotter than the liquid in the carafe, this liquid will have a tendency to rise in the colder liquid thus further mixing the liquid.

Although the disclosure discussed the construction of the devices as if they were metal, injection molding techniques using plastic may easily form any of the shapes shown. The attachment of the suspended devices to the lid 14 may require redesign of presently existing lids. The free standing devices may be used with existing carafes and lids without any modification thereto.

In a comparison test of the present invention, two carafes of hot coffee were brewed with and without the present invention. A straight plastic tube was friction attached to a flange about the aperture in the lid. The tube extended to within about ¼ inch of the bottom of the carafe. No swirling device was incorporated in the tube. An air vent hole was placed in the side of the tube near the flange. Without the air vent hole; the hot coffee liquid was blocked by the venting air in the aperture and started to flow over the lid. One cup of hot coffee liquid was drawn off the top from each of the two carafes and compared by color and taste. The cup made with the present invention in the carafe was significantly darker in color and the taste was much stronger than the coffee made without the present invention which had an almost watery taste.

Clearly many modifications and variations of the present invention are possible in light of the above teachings and it is therefore understood, that within the inventive scope of the inventive concept, that the invention may be practiced otherwise than specifically claimed.

What is claimed is:

1. A device for mixing a predetermined volume of forming hot liquid in a container having an input stream entering a top opening of the container, the input stream having varying concentrations, said device comprising:

means for channeling the input stream to a bottom of the container, said means for channeling is a tube-like device having one liquid inlet for the input stream and at least one liquid outlet for placing the hot liquid proximal to the bottom of the container, said means for channeling being placed within the container before the hot coffee liquid enters therein, the means for channeling being removable from the container, said means for channeling being a free standing device in of the container and resting upon the bottom of the container;

said container being a conventional glass-type carafe of a coffee maker, an initial volume of the input stream of hot coffee liquid having a high concentration of coffee chemicals therein and a final volume of the input stream having a lower concentration of coffee chemicals therein, said means for channeling causing a uniform mixing of the hot coffee liquid in the carafe during a brewing process, the hot coffee liquid being removed from the top opening in the carafe.

2. A device as defined in claim 1 further including means for swirling the hot liquid exiting from the at least one liquid outlet.

3. A device as defined in claim 1 wherein said tube-like device is a free standing, hot coffee mixing device, said free standing, hot coffee mixing device being placed in the carafe on the bottom and further approximately centered under an aperture in a lid on the carafe when being used, said free standing, hot coffee mixing device having at least one liquid outlet therein.

4. A device as defined in claim 3 wherein said at least one liquid outlet further includes means for swirling the hot coffee liquid exiting therefrom.

5. A device as defined in claim 3 wherein a bottom end of the free standing hot coffee mixing device further includes means for swirling.

6. A device as defined in claim 5 wherein the means for swirling includes a plurality of vanes integrally formed in the bottom end, the vanes impressing on an exiting hot coffee liquid either a clockwise or counter clockwise motion to further aid in the mixing of the hot coffee liquid.

7. A device as defined in claim 5 wherein the means for swirling impresses a clockwise motion as view from the top of the carafe.

8. A device as defined in claim 5 wherein the means for swirling includes a plurality of twisted wall sections integrally formed in the bottom end, the twisted wall sections impressing on an exiting hot coffee liquid either a clockwise or counter clockwise motion to further aid in the mixing of the hot coffee liquid in the carafe.

9. A device as defined in claim 5 wherein the means for swirling comprises a cork screw tube, the cork screw tube impressing on the exiting hot coffee liquid either a clockwise or counter clockwise motion to further aid in the mixing of the hot coffee liquid in the carafe.

10. A device as defined in claim 3 further including a flexible cord handle attached to a top end of the tube-like device.

11. A device as defined in claim 3 further including a translatable joint in the tube-like device to modify a height of the free standing, hot coffee mixing device to be adaptable to various sizes of coffee carafes.

* * * * *